United States Patent [19]

McCorvey et al.

[11] Patent Number: 4,766,283

[45] Date of Patent: Aug. 23, 1988

[54] APPARATUS FOR ATTACHING INSULATION TO DUCT WORK

[76] Inventors: Allan McCorvey; Timothy R. McCorvey, both of 10702 Munn, Houston, Tex. 77029

[21] Appl. No.: 28,557

[22] Filed: Mar. 20, 1987

[51] Int. Cl.⁴ .................. B23K 11/00; B23K 11/30
[52] U.S. Cl. .................................. 219/98; 219/119
[58] Field of Search .................. 219/98, 99, 95, 119

[56] References Cited

U.S. PATENT DOCUMENTS

| | | | |
|---|---|---|---|
| 3,582,603 | 6/1971 | Hinden | 219/99 |
| 3,835,285 | 9/1974 | Hinden et al. | 219/89 |
| 3,858,024 | 12/1974 | Hinden et al. | 219/119 |
| 3,909,581 | 9/1975 | Stone et al. | 219/119 X |
| 4,609,805 | 9/1986 | Tobita et al. | 219/119 X |

FOREIGN PATENT DOCUMENTS 236037  5/1986  German Democratic Rep. ... 219/98

*Primary Examiner*—H. Broome
*Assistant Examiner*—C. M. Sigda
*Attorney, Agent, or Firm*—Neal J. Mosely

[57] ABSTRACT

An electric resistance welding apparatus is shown for attaching insulation to duct work comprising a supporting anvil with a surface for supporting a sheet metal duct work with a covering sheet of insulating material and a movable hammer member spaced from and movable relative to the anvil. The hammer member has one or more magnets for supporting a resistance welding pin and is movable to drive the pin through the insulating material to engage the sheet metal duct work. The hammer member and anvil are connected in an electric welding circuit to supply current from the hammer through the pin to the anvil to fuse the end of the pin to the sheet metal with the head of the pin holding a washer tightly against the insulating material. The hammer member and anvil are both copper with recesses having cylindrical copper electrode members removably positioned therein. In one embodiment, the hammer member recess is deeper than the copper electrode member, and the magnet fits the recess behind the electrode member. The copper electrode member may be recessed to contact the pin head portion when positioned on the hammer. In another embodiment, the pin is magnetic and the washer is non-magnetic. In this embodiment the hammer member has a flange at one end with recesses or passages in which there are positioned bar magnets to cooperate with the washer on the resistance welding pin to secure the pin on the hammer member.

21 Claims, 1 Drawing Sheet

APPARATUS FOR ATTACHING INSULATION TO DUCT WORK

BACKGROUND OF THE INVENTION

1. Field of the Invention

This invention relates to new and improved apparatus for attaching insulation to duct work and more particularly to improved hammers and anvils for resistance stud welders and improved retaining pins used in such apparatus.

2. Brief Description of the Prior Art

Hogg et al U.S. Pat. No. 2,110,832 discloses a stud welding apparatus with a special tool for holding a resistance welding pin for attaching insulation to duct work wherein a hammer drives the pin and washer through the insulation to contact metal duct work supported on an anvil and the hammer and anvil comprise the electrodes of the stud welding apparatus.

Nelson U.S. Pat. No. 2,378,720 discloses a chuck for holding the head of a resistance welding pin for use in a stud welding apparatus.

Hinden U.S. Pat. No. 3,591,762 discloses a stud welding apparatus for driving a resistance welding pin for attaching insulation to duct work wherein a hammer drives the pin and washer through the insulation to contact metal duct work supported on an anvil and the hammer and anvil comprise the electrodes of the stud welding apparatus.

Hinden U.S. Pat. No. 3,835,285 discloses an automatic stud welding apparatus for driving a resistance welding pin for attaching insulation to duct work wherein a hammer drives the pin and washer through the insulation to contact metal duct work supported on an anvil and the hammer and anvil comprise the electrodes of the stud welding apparatus.

Hinden U.S. Pat. No. 3,858,024 discloses a multiple head stud welding apparatus for driving a resistance welding pin for attaching insulation to duct work wherein a hammer drives the pin and washer through the insulation to contact metal duct work supported on an anvil and the hammer and anvil comprise the electrodes of the stud welding apparatus.

Hinden U.S. Pat. No. 3,582,603 discloses a method and apparatus for attaching insulation to duct work utilizing a special retaining pin and washer in a stud welding apparatus wherein a hammer drives the pin and washer through the insulation to contact metal duct work supported on an anvil where the hammer and anvil comprise the electrodes of a stud welding apparatus.

Hinden U.S. Pat. No. 4,031,350 discloses a special resistance welding pin and method and apparatus for attaching insulation to duct work utilizing a special retaining pin and washer in a stud welding apparatus wherein a hammer drives the pin and washer through the insulation to contact metal duct work supported on an anvil where the hammer and anvil comprise the electrodes of a stud welding apparatus.

Hinden U.S. Pat. No. 4,429,209 discloses another special resistance welding pin, having a corrugated shank, and method and apparatus for attaching insulation to duct work utilizing a special retaining pin and washer in a stud welding apparatus wherein a hammer drives the pin and washer through the insulation to contact metal duct work supported on an anvil where the hammer and anvil comprise the electrodes of a stud welding apparatus.

Hinden U.S. Pat. No. 4,482,795 discloses another special resistance welding pin, having axially extending heat radiating ribs, and method and apparatus for attaching insulation to duct work utilizing a special retaining pin and washer in a stud welding apparatus wherein a hammer drives the pin and washer through the insulation to contact metal duct work supported on an anvil where the hammer and anvil comprise the electrodes of a stud welding apparatus.

Hinden U.S. Pat. No. 3,701,878 discloses another special resistance welding pin, having a flat shank folded from the same material as the head or washer portion, and method and apparatus for attaching insulation to duct work utilizing a special retaining pin and washer in a stud welding apparatus wherein a hammer drives the pin and washer through the insulation to contact metal duct work supported on an anvil where the hammer and anvil comprise the electrodes of a stud welding apparatus.

Hinden U.S. Pat. No. 3,624,340 discloses a special resistance welding pin, and method and apparatus for attaching insulation to duct work utilizing a special retaining pin and washer in a stud welding apparatus wherein a hammer drives the pin and washer through the insulation to contact metal duct work supported on an anvil where the hammer and anvil comprise the electrodes of a stud welding apparatus.

SUMMARY OF THE INVENTION

One of the objects of this invention is to provide an improved electric resistance welding apparatus for attaching insulation to duct work having an anvil for supporting a sheet metal duct work with a covering sheet of insulating material and a hammer member movable relative to the anvil to drive a resistance welding pin through the insulation to engage the sheet metal and weld thereto.

Another object of this invention is to provide an improved electric resistance welding apparatus for attaching insulation to duct work having an anvil for supporting a sheet metal duct work with a covering sheet of insulating material and a hammer member movable relative to the anvil to drive a resistance welding pin through the insulation to engage the sheet metal and weld thereto with removable electrodes recessed in the hammer member and anvil.

Another object of this invention is to provide an improved electric resistance welding apparatus for attaching insulation to duct work having an anvil for supporting a sheet metal duct work with a covering sheet of insulating material and a hammer member movable relative to the anvil to drive a resistance welding pin through the insulation to engage the sheet metal and weld thereto where the resistance welding pin is held in place by a magnet in the hammer member.

Still another object of this invention is to provide an improved electric resistance welding apparatus for attaching insulation to duct work having an anvil for supporting a sheet metal duct work with a covering sheet of insulating material and a hammer member movable relative to the anvil to drive a resistance welding pin through the insulation to engage the sheet metal and weld thereto where the resistance welding pin has a magnetic head and is held in place by a magnet in the hammer member positioned behind the electrode member.

Still another object of this invention is to provide an improved electric resistance welding apparatus for attaching insulation to duct work having an anvil for supporting a sheet metal duct work with a covering sheet of insulating material and a hammer member movable relative to the anvil to drive a resistance welding pin through the insulation to engage the sheet metal and weld thereto where the resistance welding pin has a washer of iron or steel and is held in place by magnets spaced around a flange on the hammer member.

Still another object of this invention is to provide an improved electric resistance welding apparatus for attaching insulation to duct work having an anvil for supporting a sheet metal duct work with a covering sheet of insulating material and a hammer member movable relative to the anvil to drive a resistance welding pin through the insulation to engage the sheet metal and weld thereto with removable copper electrodes recessed in the hammer member and anvil, at least one of the electrode members being secured in place by a set screw fitting a groove therein.

Other objects of this invention will become apparent from time to time throughout the specification and claims as hereinafter related.

The foregoing objects and other objects of this invention are accomplished by an electric resistance welding apparatus for attaching insulation to duct work comprising a supporting anvil with a surface for supporting a sheet metal duct work with a covering sheet of insulating material and a movable hammer member spaced from and movable relative to the anvil. The hammer member has one or more magnets for supporting a resistance welding pin and is movable to drive the pin through the insulating material to engage the sheet metal duct work. The hammer member and anvil are connected in an electric welding circuit to supply current from the hammer through the pin to the anvil to fuse the end of the pin to the sheet metal with the head of the pin holding a washer tightly against the insulating material. The hammer member and anvil are both copper with recesses having cylindrical copper electrode members removably positioned therein. In one embodimeant, the hammer member recess is deeper than the copper electrode member, and the magnet fits the recess behind the electrode member. The copper electrode member may be recessed to allow the said pin head portion when positioned therein. In another embodiment, the washer is non-magnetic and the pin is iron or steel. In this embodiment the hammer member has a flange at one end with recesses or passages in which there are positioned bar magnets to cooperate with the washer on the resistance welding pin to secure the pin on the hammer member.

DESCRIPTION OF PRIOR ART APPARATUS

Figure 1:
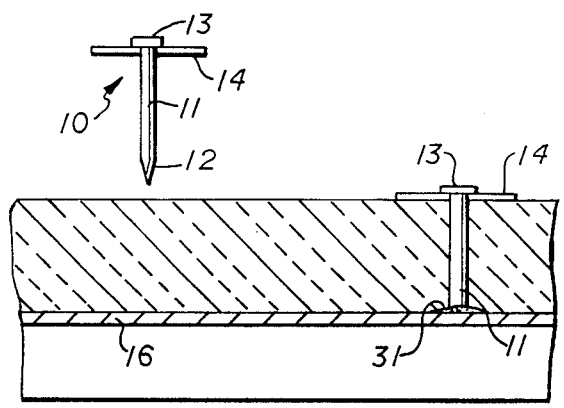
FIG. 1 is a view in vertical cross section of a prior art apparatus for attaching insulation to duct work showing insulation positioned on the duct work with one retaining nail and washer welded in place and another retaining nail and washer in spaced relation about to be driven into retaining position.
Figure 2:
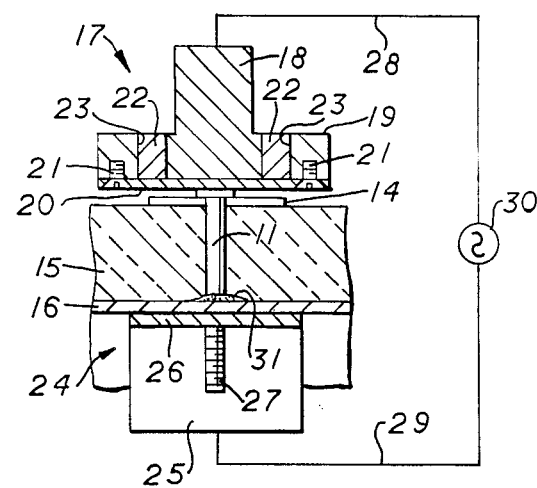
FIG. 2 is a view in vertical cross section, similar to FIG. 1, of a prior art apparatus for attaching insulation to duct work showing insulation positioned on the duct work with one retaining nail and washer welded in place and showing the hammer and anvil structure and associated welding circuit for stud welding the retaining nail and washer in place.

Referring to the drawings by numerals of reference, and particularly FIGS. 1 and 2, there is shown a prior art apparatus for stud welding insulation to sheet metal duct work. An electric resistance welding pin 10 comprises a cylindrical shank portion 11 with a pointed end 12 and a head portion 13 which retains a washer 14 in place. The pin 10 is driven by a hammer member through a sheet of insulation 15 into contact with the wall of sheet metal 16 of a sheet metal duct work.

In FIG. 2, it is seen that hammer member 17 has a cylindrical body portion 18 with a lower flange portion 19. A copper plate 20 is fastened to the flanged portion 19 by machine screws 21. Plate 21 is the electrical conductor from the hammer 17 to the head 13 of welding pin 10. Cylindrical bar magnets 22 are supported in holes 23 in flange portion 19 to hold pin 10 in place during movement of hammer 17.

Insulation 15 and sheet metal 16 are supported on an anvil 24 having a body portion 25 with copper plate 26 fastened thereon by machine screws 27. Plate 26 is the electrical conductor from tip 12 of welding pin 10 and sheet metal 16. Hammer 17 and anvil 24 are connected by leads 28 and 29 to a power supply 30 for resistance welding.

Figure 3:
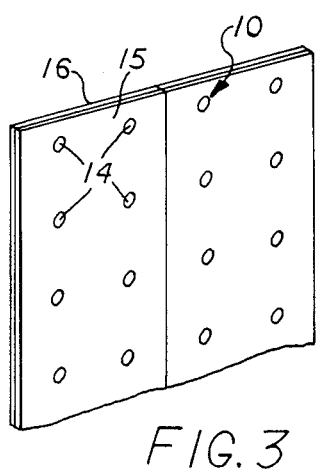
FIG. 3 is an isometric view of a portion of a duct work wall showing the insulation retained in place by a plurality of nails with retaining washers stud welded to the duct work.

The movement of hammer 17 carries welding pin 10 with it, supported by magnets 23. When hammer 17 drives pin 10 through insulation 15 into contact with sheet metal 16, a resistance welding circuit is completed, as seen in FIG. 2, which heats pin 10 to a point where the tip 12 is fused and welded to sheet metal 16, as indicated at 31. Any conventional resistance welding or stud welding apparatus can be used, especially those discussed in the introduction above. The product is illustrated in FIG. 3 as sheet metal 16 with a layer of insulation 15 held thereon by a plurality of resistance welding pins 10 and their washers 14.

The apparatus so far described is commercially available and may function with any of a variety of hammer-anvil welding mechanisms, particularly as described above. This type of apparatus, however, has had the disadvantage of excessive electrical erosion in the electrical contact areas on the hammer and the anvil. The plates 20 and 26 wear rapidly and are very expensive to replace. As a result, there has been a need for an improved electrode structure in this type of welding apparatus.

DESCRIPTION OF THE PREFERRED EMBODIMENTS

Figure 4:
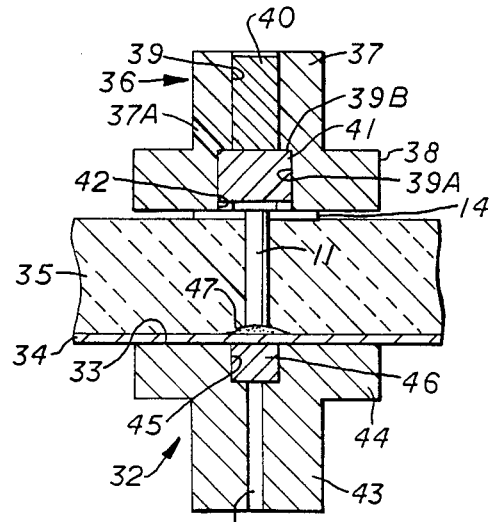
FIG. 4 is a view in vertical cross section, similar to FIG. 1, of a preferred embodiment of this invention comprising an apparatus for attaching insulation to duct work showing insulation positioned on the duct work with one retaining nail and washer welded in place and having an improved hammer and anvil structure for stud welding the retaining nail and washer in place utilizing replaceable electrode buttons in the hammer and anvil.
Figure 5:
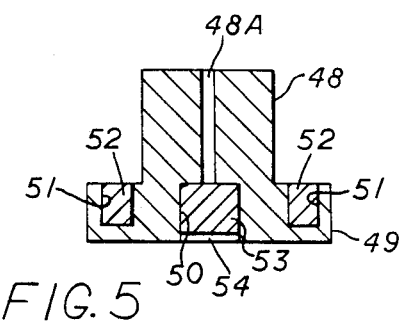
FIG. 5 is a view in vertical cross section of another embodiment of the hammer structure utilizing replaceable electrode buttons and retaining magnets for the retaining nail and washer.

In FIGS. 4–8, there are shown preferred embodiments of this invention. FIG. 4 is similar to the prior art apparatus shown in FIG. 2. In this embodiment, there is shown an electric resistance welding apparatus for attaching insulation to duct work comprising a supporting anvil 32 having a surface 33 for supporting a sheet metal duct work 34 with a sheet insulating material 35 positioned thereon.

A movable hammer member 36 is positioned initially in spaced relation to anvil 32. Hammer member 36 has cylindrical body portion 37 and flange portion 38 at the lower, striking end or face thereof. A central aperture 39 extends from the lower, striking face through the body portion 37 and has lower enlarged portion or counterbore 39a with adjacent shoulder 39b. A cylindrical bar magnet 40 is positioned in the upper portion of aperture 39. A removable cylindrical copper electrode 41 is positioned below the magnet 40 and is preferably recessed a short distance inside the counterbore 39a against shoulder 39b to provide a small recess 42 to receive the head 13 of resistance welding pin 10. A passage 37a extends to the top of counterbore 39a to permit insertion of a small diameter rod for driving out the electrode 41 for replacement thereof.

Anvil 32 has a cylindrical body portion 43 and upper flange portion 44. A central aperture or recess 45 extends from the upper, supporting face 33 and may extend into the body portion 43. A removable cylindrical copper electrode 46 is positioned in the aperture or recess 45 to provide electrical contact with the sheet metal 34 resting thereon. A passage 43a extends to the bottom of recess 45 to permit insertion of a small diameter rod for driving out the electrode 46 for replacement thereof.

Magnet 40 supports a resistance welding pin 10 by attraction of the head 13 of welding pin 10 which is of iron, steel or other magnetic metal, during movement of hammer member 36 from a raised to a lowered position. Downward movement of hammer member 36 drives pin 10 through the insulating material 35 to engage sheet metal duct work 34. When hammer member 36 drives pin 10 through insulation 35 into contact with sheet metal 34, a resistance welding circuit is completed, as seen in FIG. 2, which heats pin 10 to a point where the tip 12 is fused and welded to sheet metal 34, as indicated at 47. The removable electrodes 41 and 46 are of a size capable of carrying high welding currents and are quite resistant to electrical erosion. After a long period of use, the electrical wear on electrodes 41 and 46 will require their replacement, which is both easy and relatively inexpensive. As described in connection with the prior art apparatus of FIGS. 1 and 2, any conventional resistance welding or stud welding apparatus can be used, especially those discussed in the introduction above.

In FIGS. 5–8, there is shown a further embodiment of the invention. A movable hammer member 47a is substituted for hammer member 36 and positioned initially in spaced relation to the anvil. Hammer member 47a has a cylindrical body portion 48 and a flange portion 49 at the lower, striking end or face thereof. A central recess 50 extends from the lower, striking face into the body portion 48. Flange portion 49 has recesses 51 spaced therearound. Cylindrical bar magnet 52 are positioned in recesses 51. A removable cylindrical copper electrode 53 is recessed a short distance inside the recess 50 to provide a small recess 54 to receive the head 13 of resistance welding pin 10. A passage 48a extends to the top of recess 50 to permit insertion of a small diameter rod for driving out the electrode 53 for replacement thereof.

Anvil 55 has a cylindrical body portion 56 and upper flange portion 57. A central recess 58 extends into body portion 56 and has a bottom wall 58a. A removable copper electrode 60 is sized to fit in the recess 58 and rests on bottom wall 58a. Electrode 60 has undercut portion or groove 62 in its mid-portion. The upper face of electrode 60 provides electrical contact with the sheet metal 34 resting thereon. Body portion 56 has a threaded opening 64 receiving set screw 65 extending into groove 62 to lock electrode 60 in place. A passage 63 extends to the bottom of recess 58 to permit insertion of a small diameter rod for driving out the electrode 60 for replacement thereof. Electrode 60 can be reversed and reinserted in recess 58 after electrical erosion on one side.

Figure 7:
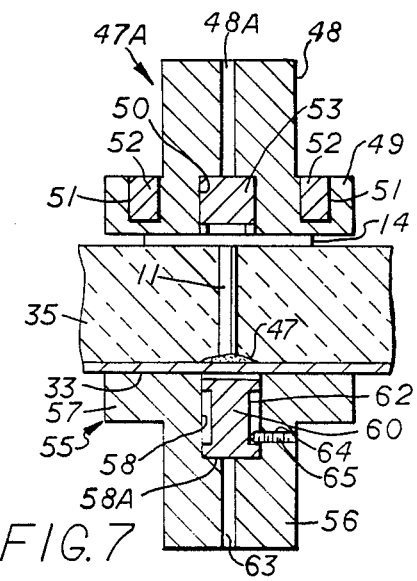
FIG. 7 is a view in vertical cross section, similar to FIG. 4, of another embodiment of this invention comprising an apparatus for attaching insulation to duct work showing insulation positioned on the duct work with one retaining nail and washer welded in place and having an improved hammer and anvil structure, as shown in FIGS. 5 and 6, for stud welding the retaining nail and washer in place utilizing replaceable electrode buttons in the hammer and anvil.

In FIG. 7, it is seen that magnets 52 support a resistance welding pin 10 by attraction of the washer 14 of welding pin 10 which is of iron, steel or other magnetic metal, during movement of hammer member 47a from a raised to a lowered position. Downward movement of hammer member 47a drives pin 10 through the insulating material 35 to engage sheet metal duct work 34. When hammer member 47a drives pin 10 through insulation 35 into contact with sheet metal 34, a resistance welding circuit is completed, as seen in FIG. 2, which heats pin 10 to a point where the tip 12 is fused and welded to sheet metal 34, as indicated at 47.

The removable electrodes 53 and 60 are of a size capable of carrying high welding currents and are quite resistant to electrical erosion. After a long period of use, electrical wear on electrodes 53 and 60 will require their replacement, which is both easy and relatively inexpensive. Electrode 60 is released by unthreading set screw 65. As described in connection with the prior art apparatus of FIGS. 1 and 2, any conventional resistance welding or stud welding apparatus can be used, especially those discussed in the introduction above.

The resistance welding pin 10 of FIGS. 1, 2 and 4 has a rod-like shank 11 with a pointed end 12 and an enlarged head portion 13 with a substantially flat washer 14 thereon. At least part of the washer 14 and head portion 13 are of magnetic material, e.g. iron or steel, cooperable with the magnet or magnets 40 and 52 to secure pin 10 on hammer member 36 or 47.

Figure 8:
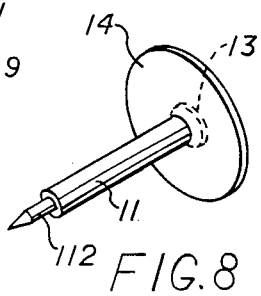
FIG. 8 is an isometric view of an improved retaining nail and washer for use with the apparatus shown in any of FIGS. 1–7.
Figure 6:
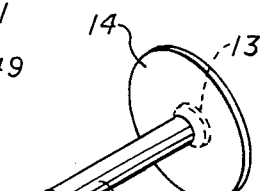
FIG. 6 is a view in vertical cross section of another embodiment of the anvil structure utilizing replaceable electrode buttons.

When a centrally located magnet is used, as in FIG. 4, only the shank 11 and head 13 of pin 10 need be magnetic. The washer 14 can be a non-magnetic metal disc or may be of a non-metallic material such as paper, paper board, fiber board, plastic, etc. When peripherally located magnets 52 are used, as in FIG. 5, only the washer 14 need be magnetic. The shank 11 and head 13 of pin 10 is magnetic. In either type of pin, the lower end may be pointed as at 12 (FIG. 1) or may have the variation shown in FIG. 8. In FIG. 8, pin 10 has a shank portion 11 with a head portion 13 against which the washer 14 is supported. The lower end 112, however, rather is of reduced diameter and pointed, as in FIG. 8. This embodiment needs only the reduced diameter portion 112 to be fused during the resistance welding operation.

While this invention has been described fully and completely, as required by the Patent Laws, it should be understood that, within the scope of the appended claims, this invention may be practiced otherwise than as specifically described herein.

We claim:

1. An electric resistance welding apparatus for attaching insulation to duct work comprising
    a supporting anvil having a substantially uninterrupted planar surface for supporting a sheet metal duct work with a sheet insulating material positioned thereon,
    at least one resistance welding pin,
    a movable hammer member positioned in spaced relation to and aligned with said anvil, including magnetic means adapted to support said resistance welding pin on a pin-supporting surface thereof, and movable toward and away from said anvil to drive said pin through said insulating material to engage said sheet metal duct work,
    said hammer member and anvil each having an electrode electrically connected by said pin through said insulating material on engagement with said sheet metal duct work,
    means for supplying an electric welding current through said electrodes, said pin and said sheet metal to weld the end of said pin to said sheet metal,
    said pin having a rod-like shank with a pointed or small diameter end and an enlarged head portion with a substantially flat washer thereon, at least part of said washer and head portion being of magnetic material cooperable with said magnetic means to secure said pin on said hammer member,
    said hammer member being of metal with a recess formed in said pin supporting surface of a size receiving said pin head portion and permitting said washer to rest flat against said pin-supporting surface,
    a cylindrical highly conductive metal electrode member removably positioned in said hammer recess to engage said pin head portion,
    said anvil being of metal with a recess formed in said planar sheet metal supporting surface,
    a cylindrical highly conductive electrode member removably positioned in said anvil recess at or below said planar sheet metal supporting surface, and
    said removable electrode members carrying the main flow of welding current to direct the same through said pin and sheet metal to weld the same together on operation of said hammer to drive said pin through said insulation to contact said sheet metal and energizing said current supplying means to bring said washer into contact with said insulation, said electrode members being replaceable after predetermined electrical erosion.

2. An apparatus according to claim 1 in which said hammer member recess is of greater depth than the length of the hammer member electrode member, and
    said magnetic means comprises a bar magnet shaped to fit said hammer member recess behind the electrode member positioned therein.

3. An apparatus according to claim 1 in which
    said pin comprises a rod-like shank of magnetic material with a pointed or small diameter end and an enlarged head portion with a substantially flat washer thereon,
    said washer being a flat disc fitting around said shank against said enlarged head portion, and
    said head portion being cooperable with said magnetic means to secure said pin on said hammer member.

4. An apparatus according to claim 1 in which
    said pin comprises a rod-like shank with a pointed or small diameter end and an enlarged head portion with a substantially flat washer thereon,
    said washer being a flat disc of magnetic material fitting around said shank against said enlarged head portion, and
    said washer being cooperable with said magnetic means to secure said pin on said hammer member.

5. An apparatus according to claim 1 in which
    said hammer member comprises a cylindrical metal member with striking end and a surrounding flange therearound,
    said hammer member having a recess or passage extending through said striking end into said cylindrical metal member, and
    said cylindrical highly conductive metal electrode member being removably positioned in said hammer electrode recess.

6. An apparatus according to claim 1 in which
    said hammer member comprises a cylindrical metal member with striking end and a surrounding flange therearound,
    said hammer member having a recess or passage extending through said striking end into said cylindrical metal member to a depth greater than the length of the hammer member electrode member,
    said cylindrical highly conductive metal electrode member being removably positioned in said hammer electrode recess, and
    said magnetic means comprising a bar magnet shaped to fit said hammer member recess behind the electrode member positioned therein.

7. An apparatus according to claim 1 in which
    said anvil comprises a cylindrical metal member with supporting end and a surrounding flange therearound,
    said anvil having a recess extending through said supporting end into said cylindrical metal member,
    said cylindrical highly conductive metal electrode member being removably positioned in said anvil electrode recess, and
    said hammer member and anvil being positioned in opposed relation with said recesses and electrode members aligned for conduction of welding current through said pin and sheet metal for stud welding said pin to said sheet metal on movement by said hammer member into engagement with said sheet metal.

8. An electric resistance welding apparatus for attaching insulation to duct work comprising a supporting anvil comprising a cylindrical metal member with a surrounding flange providing a substantially uninterrupted planar surface for supporting a sheet metal duct work with a sheet insulating material positioned thereon, said anvil having a recess extending through said planar surface into said cylindrical metal member, a movable hammer member positioned in spaced relation to and aligned with said anvil, including magnetic means adapted to support a resistance welding pin on a pinsupporting surface thereof, and movable toward and away from said anvil to drive said pin through said insulating material to engage said sheet metal duct work, said hammer member and anvil each having an electrode electrically connected by a pin through said insulating material on engagement with said sheet metal duct work, means for supplying an electric welding current through said electrodes and said sheet metal to weld the end of a pin to said sheet metal, the said pin having a rod-like shank with a pointed or small diameter end and an enlarged head portion with a substantially flat washer thereon, at least part of said washer and head portion being of magnetic material cooperable with said magnetic means to secure said pin on said hammer member, said hammer member being of metal with a recess formed in the pin supporting surface of a size adapted to receive the pin head portion and permitting the washer to rest flat against said pin-supporting surface, a cylindrical highly conductive metal electrode member removably positioned in said hammer recess to engage the pin head portion, said anvil being of metal with a recess formed in said planar sheet metal supporting surface, a highly conductive metal anvil electrode member having a cylindrical body portion with a flange surrounding each end and a peripheral groove at the mid-portion, said highly conductive metal anvil electrode member being fitted into said anvil recess against the bottom wall thereof with one of its flanges at the upper surface of the anvil, said anvil cylindrical metal member having a threaded aperture aligned with said electrode member peripheral groove and a set screw threaded into locking position in said groove, and said hammer member and anvil being positioned in opposed relation with said recesses and electrode members aligned for conduction of welding current through a pin and sheet metal for stud welding said pin to said sheet metal on movement by said hammer member into engagement with said sheet metal, said electrode members being replaceable after predetermined electrical erosion.

9. An apparatus according to claim 1 in which said hammer member comprises a cylindrical metal member with striking end and a surrounding flange therearound, said hammer member having a recess or passage extending through said striking end into said cylindrical metal member to a depth greater than the length of the hammer member electrode member, said cylindrical highly conductive metal electrode member being removably positioned in said hammer electrode recess, said pin comprises a rod-like shank with a pointed or small diameter end and an enlarged head portion with a substantially flat washer thereon, said washer being a flat disc of magnetic material fitting around said shank against said enlarged head portion, said hammer member having a plurality of recesses or passages in said surrounding flange, said magnetic means comprising bar magnets positioned in said hammer member flange recesses, and said washer being cooperable with said magnets to secure said pin on said hammer member.

10. An apparatus according to claim 1 in which said hammer member and said anvil are each of copper, and said electrode members are of copper.

11. An apparatus according to claim 5 in which said hammer member and said anvil are each of copper, and said electrode members are of copper.

12. An apparatus according to claim 6 in which said hammer member and said anvil are each of copper, and said electrode members are of copper.

13. An apparatus according to claim 7 in which said hammer member and said anvil are each of copper, and said electrode members are of copper.

14. An apparatus according to claim 8 in which said hammer member and said anvil are each of copper, and said electrode members are of copper.

15. An apparatus according to claim 9 in which said hammer member and said anvil are each of copper, and said electrode members are of copper.

16. An apparatus according to claim 1 in which said pin comprises a rod-like shank of magnetic material with a pointed or small diameter end and an enlarged head portion of iron or steel with a substantially flat washer thereon, said washer being a flat disc fitting around said shank against said enlarged head portion, and said iron or steel head portion being cooperable with said magnetic means to secure said pin on said hammer member.

17. An apparatus according to claim 1 in which said pin comprises a rod-like shank with a pointed or small diameter end and an enlarged head portion of a non-magnetic metal with a substantially flat washer thereon, said washer being a flat disc of iron or steel fitting around said shank against said enlarged head portion, and said washer being cooperable with said magnetic means to secure said pin on said hammer member.

18. An apparatus according to claim 6 in which said hammer member having a passage through a wall thereof into said electrode member recess to receive a tool for removal of said electrode member for replacement thereof.

19. An apparatus according to claim 7 in which said anvil having a passage through a wall thereof into said electrode member recess to receive a tool for removal of said electrode member for replacement thereof.

20. An apparatus according to claim 1 in which said anvil electrode member having an undercut or groove at the mid-portion thereof, and said anvil having a passage through a wall thereof into said electrode member recess with a set screw therein fitting into said electrode member groove for retaining said electrode member in place.

21. An electric resistance welding apparatus for attaching insulation to duct work comprising a supporting anvil having a substantially uninterrupted planar surface for supporting a sheet metal duct work with a sheet insulating material positioned thereon, a movable hammer member positioned in spaced relation to and aligned with said anvil, including magnetic means adapted to support a resistance welding pin on a pin-supporting surface thereof, and movable toward and away from said anvil to drive a pin, when supported thereon, through said insulating material to engage said sheet metal duct work, said hammer member and anvil each having an electrode electrically connected by a pin, when supported on said hammer, through said insulating material on engagement with sheet metal duct work, means for supplying an electric welding current through said electrodes, a pin and sheet metal, during operation of said apparatus to weld the end of a pin to sheet metal, said apparatus being adapted for operation with a pin having a rod-like shank with a pointed or small diameter end and an enlarged head portion with a substantially flat washer thereon, at least part of said washer and head portion being of magnetic material cooperable with said magnetic means to secure said pin on said hammer member, said hammer member being of metal with a recess formed in the pin supporting surface of a size receiving a pin head portion and permitting a washer thereon to rest flat against said pin-supporting surface, a cylindrical highly conductive metal electrode member removably positioned in said hammer recess to engage a pin head portion, said anvil being of metal with a recess formed in said planar sheet metal supporting surface, a cylindrical highly conductive electrode member removably positioned in said anvil recess at or below said planar sheet metal supporting surface, and said removable electrode members carrying the main flow of welding current to direct the same through a pin and sheet metal to weld the same together on operation of said hammer to drive a pin through said insulation to contact said sheet metal and energizing said current supplying means to bring said washer into contact with said insulation, said electrode members being replaceable after predetermined electrical erosion.

* * * * *